US006353643B1

United States Patent
Park

(10) Patent No.: US 6,353,643 B1
(45) Date of Patent: Mar. 5, 2002

(54) SMART ANTENNA RECEIVER USING PILOT SIGNAL IN CDMA MOBILE COMMUNICATION SYSTEM AND SIGNAL RECEIVING METHOD THEREFOR

(75) Inventor: Jin-Soo Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/143,811

(22) Filed: Aug. 31, 1998

(30) Foreign Application Priority Data

Aug. 30, 1997 (KR) ............................................. 97-43738

(51) Int. Cl.$^7$ ................................................. H04B 1/69
(52) U.S. Cl. ........................ 375/347; 375/130; 375/136
(58) Field of Search ................................. 375/147, 148, 375/346, 347, 130, 136, 232; 370/335, 342

(56) References Cited

U.S. PATENT DOCUMENTS 5,923,700 A * 7/1999 Zhang ........................ 375/141
6,069,912 A * 5/2000 Sawahashi et al. .......... 375/142

FOREIGN PATENT DOCUMENTS

| EP | 0526439 | 2/1993 |
| EP | 0564937 | 10/1993 |
| EP | 0606546 | 7/1994 |

OTHER PUBLICATIONS

F. Dominique et al., Despread Data Rate Update Multitarget Adaptive Array for CDMA Signals, Electronic Letters, vol. 33, No. 2, Jan. 16, 1997, pp. 119–121.
B. Widrow et al., "Adaptive Noise Cancelling: Principles and Applications", Proceedings of the IEEE, vol. 63, No. 12, Dec. 1, 1975, pp. 1692–1716.

* cited by examiner

*Primary Examiner*—Chi Pham
*Assistant Examiner*—Kevin M Burd
(74) *Attorney, Agent, or Firm*—Dilworth & Barrese, LLP

(57) ABSTRACT

A smart antenna receiver in a CDMA communication system and a signal receiving method therefor. Radio signals received respectively through a plurality of antennas are multiplied by adaptive weights and the multiplied signals are summed to generate an array output signal. The array output signal is multiplied by a pseudo noise code detected from the pilot signal to generate a despread signal, and the despread signal is filtered. An amplitude of the filtered signal is adjusted and the adjusted signal is multiplied by the pseudo noise code to generate a reference signal. The difference between the reference signal and the array output signal is calculated to generate an error signal. An optimal adaptive weight is generated by using the generated error signal and the radio signals.

4 Claims, 2 Drawing Sheets

SMART ANTENNA RECEIVER USING PILOT SIGNAL IN CDMA MOBILE COMMUNICATION SYSTEM AND SIGNAL RECEIVING METHOD THEREFOR

BACKGROUND OF THE INVENTION

1. Field of the Invention

The present invention relates to a mobile communication system, and more particularly, to a smart antenna receiver in a CDMA (Code Division Multiple Access) communication system and a signal receiving method therefor.

2. Description of the Related Art

A smart antenna receiver using adaptive antenna array technology automatically adjusts an antenna to the optimal direction according to information obtained by receiving an input signal by respective elements.

As indicated in FIG. 1, a conventional smart antenna receiver is comprised of a multiplier circuit 110 including a plurality of multipliers 110-1, . . . , 110-n formed correspondingly to an adaptive antenna array, a summer 120, and an adaptive processor 130 for adjusting adaptive weights.

In operation, array input vector signals X1, . . . Xn received from a plurality of antennas of an adaptive array are respectively applied to the multipliers 110-1, . . . , 110-n where they are multiplied by weights W1, . . . ,Wn of complex numbers adaptively adjusted by the adaptive processor 130. The output signals generated from the multipliers 110-1, . . . , 110-n are supplied to the summer 120 where they are summed up to generate an array output y. Thus, in a receiving beam pattern, gain is increased in the direction that a desired signal is received and a null is formed in the direction that an interference signal is received, so that a signal can be spatially selectively received. Therefore, the circuit shown in FIG. 1 is called a spatial filter. The spatial filter increases the capacity of a system by reducing the interference between the same channels in a CDMA mobile communication system.

The adaptive processor 130 for adjusting the adaptive weights of the conventional antenna receiver adjusts the adaptive weights W1, . . . , Wn only by the array input vector signals X1, . . . , Xn and the array output y. The adaptive processor 130 carries out complicated calculation processes including searching for the direction of a signal source by calculating an optimal weight, obtaining an autocorrelation matrix of a received vector signal, and obtaining an inverse matrix and a unique vector of the autocorrelation matrix.

Therefore, it takes long periods of time for the adaptive processor to process the calculations. In addition, the circuit of the adaptive processor is complicated. Consequently, it is difficult to apply the conventional smart antenna system to the CDMA mobile communication system. The reason for the complicated circuitry of the adaptive processor is because the information about the difference between the desired signal and the interference signal is not fully used.

SUMMARY OF THE INVENTION

It is therefore an object of the present invention to provide a receiving apparatus for simplifying calculation processes carried out by an adaptive processor by using a pilot signal in a CDMA mobile communication system.

It is another object of the present invention to provide a signal receiving method for simplifying calculation processes carried out by an adaptive processor by using a pilot signal in a CDMA mobile communication system.

According to an aspect of the present invention, a smart antenna receiver using a pilot signal in a base station of a CDMA mobile communication system, comprises: a plurality of multipliers for multiplying radio signals received respectively through a plurality of antennas by adaptive weights; a summer for generating an array output signal by summing outputs of the plurality of multipliers. The smart antenna receiver further includes a pseudo noise code generator for generating a pseudo noise code which is detected from the pilot signal and has been used in a transmitter; and a first multiplier for generating a despread signal by multiplying the array output signal by the pseudo noise code. A data bandwidth filter eliminates an interference component by filtering the despread signal and a limiter adjusts an amplitude of the interference component eliminated signal. Additionally, the smart antenna receiver includes a second multiplier for generating a re-spread reference signal by multiplying the amplitude adjusted signal by the pseudo noise code; a subtracter for generating an error signal by calculating the difference between the reference signal and the array output signal; and an adaptive processor for generating an optimal adaptive weight using the error signal and the radio signals.

According to another aspect of the present invention, a signal receiving method using a pilot signal in a CDMA mobile communication system using a smart antenna receiver, comprises the steps of: multiplying radio signals received respectively through a plurality of antennas by adaptive weights and summing the multiplied signals, to generate an array output signal. The signal receiving method further comprises the steps of: multiplying the array output signal by a pseudo noise code detected from the pilot signal to generate a despread signal; filtering the despread signal; adjusting an amplitude of the filtered signal; multiplying the amplitude adjusted signal by the pseudo noise code to generate a reference signal; calculating the difference between the reference signal and the array output signal to generate an error signal; and generating an optimal adaptive weight using the error signal and the radio signals.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

If coherent data is detected by using a pilot signal in a reverse link of a CDMA system, a pilot PN (Pseudo-Noise) code of a desired user can be known without particular processing. Since the pilot signal has great correlation with a desired signal and no correlation with an interference signal, the pilot signal in the reverse link can be used in an adaptive processor of a smart antenna receiver.

Figure 1:
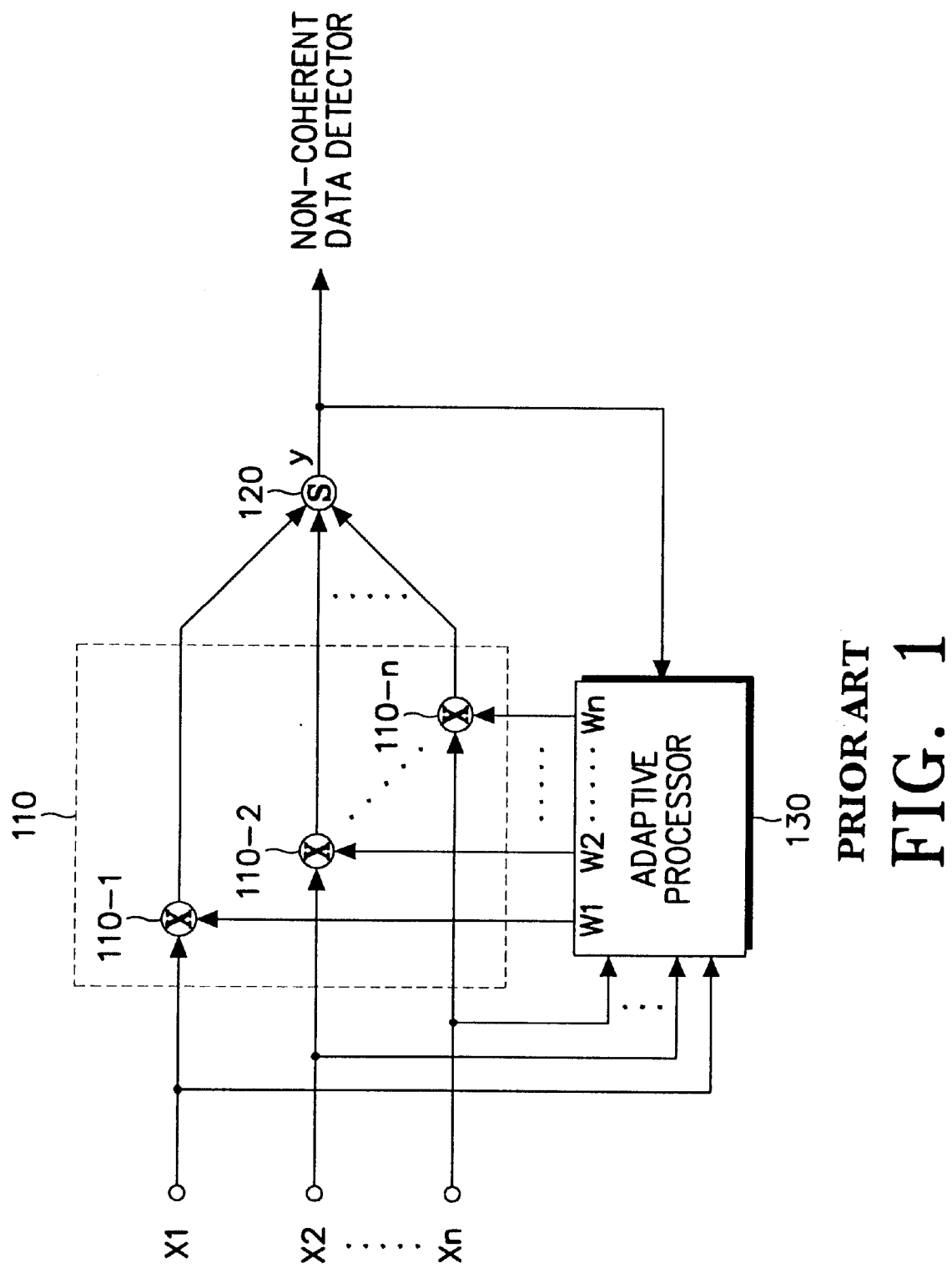
FIG. 1 is a circuit diagram of a conventional spatial filter.
Figure 2:
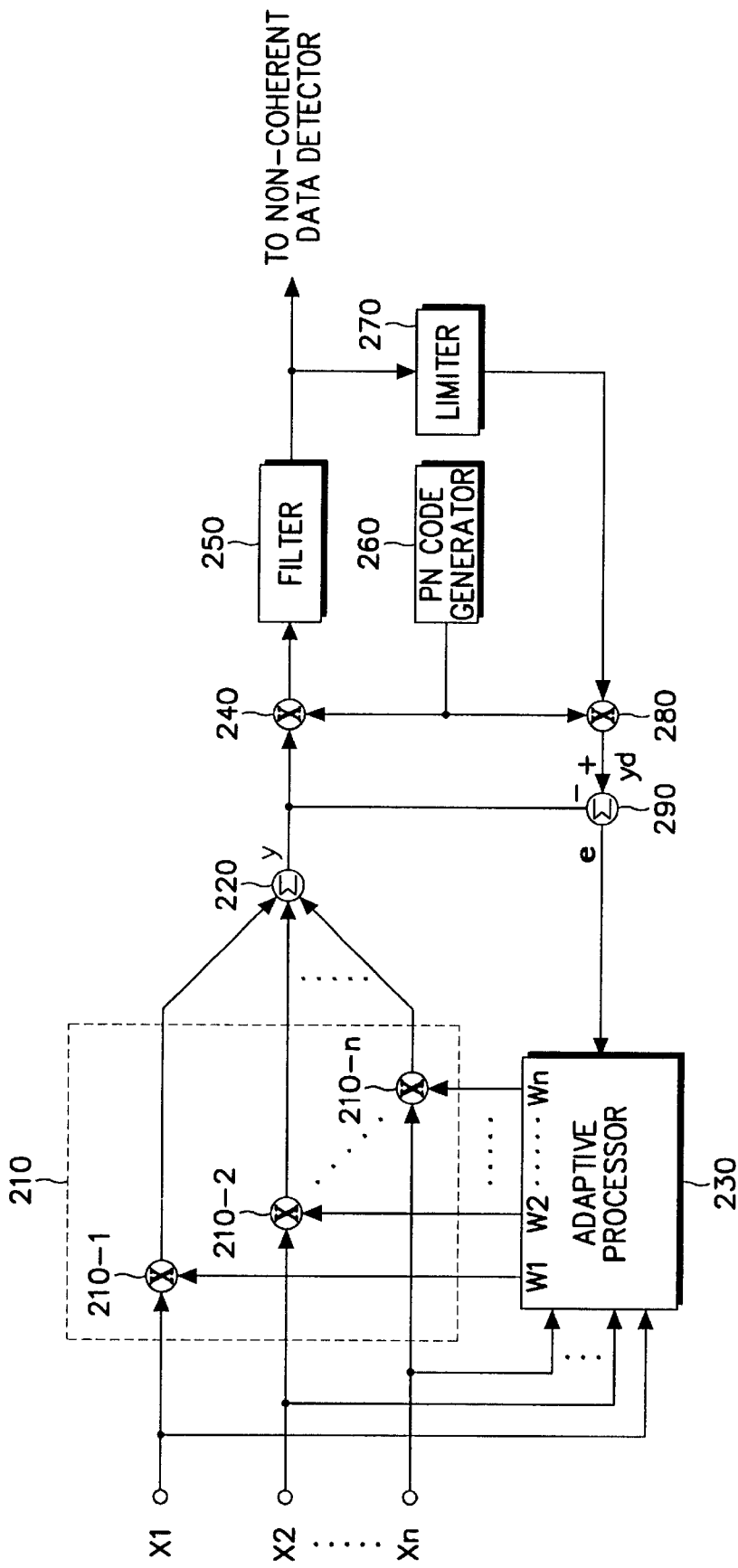
FIG. 2 is a circuit diagram of a spatial filter according to a preferred embodiment of the present invention.

As illustrated in FIG. 2, a smart antenna receiver according to a preferred embodiment of the present invention includes a multiplier circuit 210, a summer 220, an adaptive processor 230, a multiplier 240, a data bandwidth filter 250, a PN code generator 260, a limiter 270, a multiplier 280, and a subtracter 290.

A plurality of linearly or circularly arranged antennas receive radio signals X1, . . . , Xn. The multiplier circuit 210 includes a plurality of multipliers 210-1, ..., 210-n connected respectively to the antennas and multiplies the radio signals X1, ..., Xn by respective adaptive weights W1, ..., Wn. The summer 220 sums the outputs of the multipliers 210-1, ..., 210-n to generate an array output signal y. The adaptive processor 230 adjusts the adaptive weights W1, ..., Wn by performing an adaptive algorithm using an error signal $\epsilon$ generated from the subtracter 290 and by the radio signals X1, ..., Xn. The PN code generator 260 generates a pilot PN code from a received pilot signal in the reverse link. The multiplier 240 multiplies the pilot PN code by the array output signal y generated from the summer 220. A reference signal generating loop including the filter 250, the limiter 270 and the multiplier 280 generates a reference signal $y_d$ used for the adaptive algorithm of the adaptive processor 230. The subtracter 290 generates the error signal $\epsilon$ corresponding to the difference between the reference signal $y_d$ and the array output signal y.

If a desired signal and an interference signal are received respectively from the antennas of the different direction, the adaptive weight W is adjusted such that a main lobe of a receiving beam pattern is toward the desired signal and a null of the receiving beam pattern is toward the interference signal. In order to adjust the adaptive weight W, the array output signal y, that is, a linear coupling of the data vector (x) components of the radio signal X1, ..., Xn should approximate the desired signal $y_d$. In this case, $y = W \cdot x^T$.

In a least mean square (LMS) algorithm given by the following equation, the adaptive weight comes to converge upon an optimal adaptive weight for minimizing a mean square error (MSE) through repeated weight updating. The operation implemented by the adaptive processor 230 for obtaining the optimal adaptive weight can be represented by:

$$W(k+1) = W(k) + 2\mu\epsilon^*(k) \cdot x(k) \quad (1)$$

where k denotes a discrete time such as an adaptive period, $\mu$ denotes a scalar constant for adjusting an adaptive rate and stability, $\epsilon$ denotes an error signal ($y_d - y$), and * denotes a complex conjugate.

To obtain the array output signal y used to calculate the error signal $\epsilon$, the radio signals X1, ..., Xn received through the respective antennas are supplied to the respective multipliers 210-1, ..., 210-n where they are multiplied by the adaptive weights W1, ..., Wn, respectively, provided from the adaptive processor 230. The signals produced from the multipliers 210-1, ..., 210-n are applied to the summer 220 where they are summed to generate the output signal y.

To obtain the reference signal $y_d$ needed to calculate the error signal $\epsilon$, the array output signal y is applied to the subtracter 290 and the multiplier 240. The output signal y applied to the multiplier 240 is multiplied by the pilot PN code generated from the PN code generator 260. The pilot PN code is the same code as the PN code which has been multiplied by a signal of a desired user. Then the desired signal is despread by the multiplier 240 and its bandwidth is reduced to a data bandwidth. An interference component remains in a spread bandwidth. Meanwhile, if the output of the multiplier 240 passes through the data bandwidth filter 250, the desired signal remains and the interference component except an intermediate bandwidth is eliminated. The output of the filter 250 is applied to limiter 270 for adjusting the amplitude of the reference signal $y_d$. The output of the limiter 270 is applied to the multiplier 280 where it is multiplied by the pilot PN code and re-spread thereby generating the reference signal $y_d$.

The array output signal y and the reference signal $y_d$ generated respectively from the summer 220 and the multiplier 280 are applied to the subtracter 290 where the error signal $\epsilon$ corresponding to the difference therebetween is generated.

Consequently, while the desired signal passes through a loop consisting of the two multipliers 240 and 280, the filter 250, the limiter 270 and the subtracter 290 without changing, the interference component has a great change in its waveform. Therefore, there is no substantial correlation with the interference between the reference signal and the array output signal. The error signal $\epsilon$ is applied to the adaptive processor 230 so as to obtain the adaptive weight W by the above equation (1) together with the data vector x of the radio signals X1, ..., Xn. The discrete time k such as an adaptive period and the scalar constant $\mu$ needed to obtain the adaptive weight W by the equation (1) are set constants.

As described above, since the smart antenna receiver uses the reference signal generating loop using the pilot signal and the adaptive processor applying the LMS algorithm, the amount of calculation can be greatly reduced. Since the pilot signal is also used to detect coherent data in a reverse link of the CDMA system, it is useful to apply the pilot signal to the smart antenna receiver.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A smart antenna receiver using a pilot signal in a base station of a code division multiple access (CDMA) mobile communication system, comprising:

a plurality of multipliers for multiplying radio signals received respectively through a plurality of antennas by adaptive weights;

a summer for generating an array output signal by summing outputs of said plurality of multipliers;

a pseudo noise code generator for generating a pseudo noise code which is detected from said pilot signal and has been used in a transmitter;

a first multiplier for generating a despread signal by multiplying said array output signal by said pseudo noise code;

a data bandwidth filter for eliminating an interference component by filtering said despread signal;

a limiter for adjusting an amplitude of the interference component eliminated despread signal;

a second multiplier for generating a re-spread reference signal by multiplying said amplitude adjusted signal by said pseudo noise code;

a subtracter for generating an error signal by calculating the difference between said reference signal and said array output signal; and an adaptive processor for generating an optimal adaptive weight using said error signal and said radio signals.

2. The smart antenna receiver as claimed in claim 1, wherein said adaptive processor receives said error signal and said radio signals and generates an optimal adaptive weight by using the following equation:

$$W(k+1) = W(k) + 2\mu\epsilon^*(k) \cdot (k)$$

where W is an adaptive weight, k is a discrete time such as an adaptive period, $\mu$ is a scalar constant for adjusting an adaptive rate and stability, $\epsilon$ is said error signal, * is a complex conjugate, and x(k) is a vector component of a radio signal.

3. A signal receiving method using a pilot signal in a CDMA mobile communication system using a smart antenna receiver, comprising the steps of:

multiplying radio signals received respectively through a plurality of antennas by adaptive weights and summing the multiplied signals, to generate an array output signal;

multiplying said array output signal by a pseudo noise code detected from said pilot signal to generate a despread signal;

filtering said despread signal;

adjusting an amplitude of the filtered signal;

multiplying the amplitude adjusted signal by said pseudo noise code to generate a reference signal; and calculating the difference between said reference signal and said array output signal to generate an error signal; and generating an optimal adaptive weight by said error signal and said radio signals.

4. The signal receiving method as claimed in claim 3, wherein said step of generating an optimal adaptive weight uses the following equation:

$$W(k+1)=W(k)+2\mu\epsilon^*(k)\bullet(k)$$

where W is an adaptive weight, k is a discrete time such as an adaptive period, $\mu$ is a scalar constant for adjusting an adaptive rate and stability, $\epsilon$ is said error signal, * is a complex conjugate, and x(k) is a vector component of a radio signal.

* * * * *